(12) United States Patent
Tzong et al.

(10) Patent No.: US 6,827,452 B2
(45) Date of Patent: Dec. 7, 2004

(54) LCD PROJECTION SYSTEM

(75) Inventors: Ruey-Yau Tzong, Chung Ho (TW); Robin Hsiung, Chung Ho (TW)

(73) Assignee: Cinetron Technology Inc., Taipei Hsien (TW)

( * ) Notice: Subject to any disclaimer, the term of this patent is extended or adjusted under 35 U.S.C. 154(b) by 1 day.

(21) Appl. No.: 10/330,406

(22) Filed: Dec. 30, 2002

(65) Prior Publication Data

US 2004/0125342 A1 Jul. 1, 2004

(51) Int. Cl.[7] .............................................. G03B 21/00
(52) U.S. Cl. .......................... 353/33; 353/20; 353/81; 349/9
(58) Field of Search ............................... 353/8, 81, 84, 353/30–34, 20; 349/5, 7–10

(56) References Cited

U.S. PATENT DOCUMENTS

| | | | | |
|---|---|---|---|---|
| 4,127,322 A | * | 11/1978 | Jacobson et al. | 353/31 |
| 5,153,752 A | * | 10/1992 | Kurematsu et al. | 349/9 |
| 5,973,759 A | * | 10/1999 | Itoh et al. | 349/5 |
| 6,113,239 A | * | 9/2000 | Sampsell et al. | 353/31 |
| 6,439,724 B1 | * | 8/2002 | Jeon et al. | 353/31 |
| 6,665,122 B1 | * | 12/2003 | Yamagishi | 359/634 |
| 6,678,015 B2 | * | 1/2004 | Yi et al. | 348/782 |
| 6,714,743 B2 | * | 3/2004 | Hsieh et al. | 398/212 |
| 2002/0036752 A1 | * | 3/2002 | Lin | 353/31 |
| 2003/0067586 A1 | * | 4/2003 | Chigira et al. | 353/20 |

* cited by examiner

Primary Examiner—David Gray
Assistant Examiner—Andrew Sever
(74) Attorney, Agent, or Firm—Browdy and Neimark, P.L.L.C.

(57) ABSTRACT

A LCD projection system includes a beam splitter that splits a polarized light beam into a light of two primary colors and a light of one primary color, a first polarization element adapted to polarize the light of two primary colors, a second polarization element adapted to polarize the light of one primary color, a dichroic element adapted to separate the two colors of the light of two primary colors, a modulator adapted to modulate the light of tow primary colors and the light of one primary color and to reflect modulated light for output, a retarder provided between the first polarization element and the polarization element, and a projection lens adapted to project modularized light from the modulator and the first polarization element onto a display screen.

11 Claims, 2 Drawing Sheets

LCD PROJECTION SYSTEM

BACKGROUND OF THE INVENTION

1. Field of the Invention

The present invention relates to a LCD projection system and, more particularly, to such a LCD projection system that uses three LCOS (liquid crystal on silicon) for image projection output.

2. Description of the Related Art

Due to the limitation of CRT dimensions and for the sake of manufacturing cost, it is difficult to make a big scale CRT monitor. Nowadays, LCD projection technology has been well developed. Various LCD projection systems of small size and weight have been made, and have appeared on the market. Regular LCD projection systems include two types, one having one single LCOS (liquid crystal on silicon) and the other having three LCOS. A LCD projection system with three LCOS has high resolution and high brightness, however its manufacturing cost is high. Currently, most LCD projection systems are based on penetrative projection type projection system has the drawback of a low aperture ratio.

SUMMARY OF THE INVENTION

The present invention has been accomplished under the circumstances in view. It is therefore the main object of the present invention to provide a LCD projection system, which has a high aperture ratio. It is another object of the present invention to provide a LCD projection system, which has a compact size. It is sill another object of the present invention to provide a LCD projection system, which has a simple structure. It is still another object of the present invention to provide a LCD projection system, which is inexpensive to manufacture. To achieve these and other objects of the present invention, the LCD projection system comprises a beam splitter adapted to split a polarized light beam of three primary colors passing from a non-polarized white light through a polarized component of the LCD projection system into a light of two primary colors and a light of one primary color; a first polarization element disposed in the light output side of the beam splitter and adapted to polarize the light of two primary colors; a second polarization element disposed in the light output side of the beam splitter and adapted to polarize the light of one primary color; a dichroic element provided near one side of the first polarization element and adapted to separate the two colors of the light of two primary colors; modulator means disposed at one side relative to the second polarization element and the dichroic element and adapted to modulate the light of tow primary colors and the light of one primary color and to reflect modulated light for output; a retarder provided between the first polarization element and the polarization element; and a projection lens disposed near one side of the first polarization element and adapted to project modularized light from the modulator means and the first polarization element onto a display screen.

DETAILED DESCRIPTION OF THE PREFERRED EMBODIMENT

Figure 1:
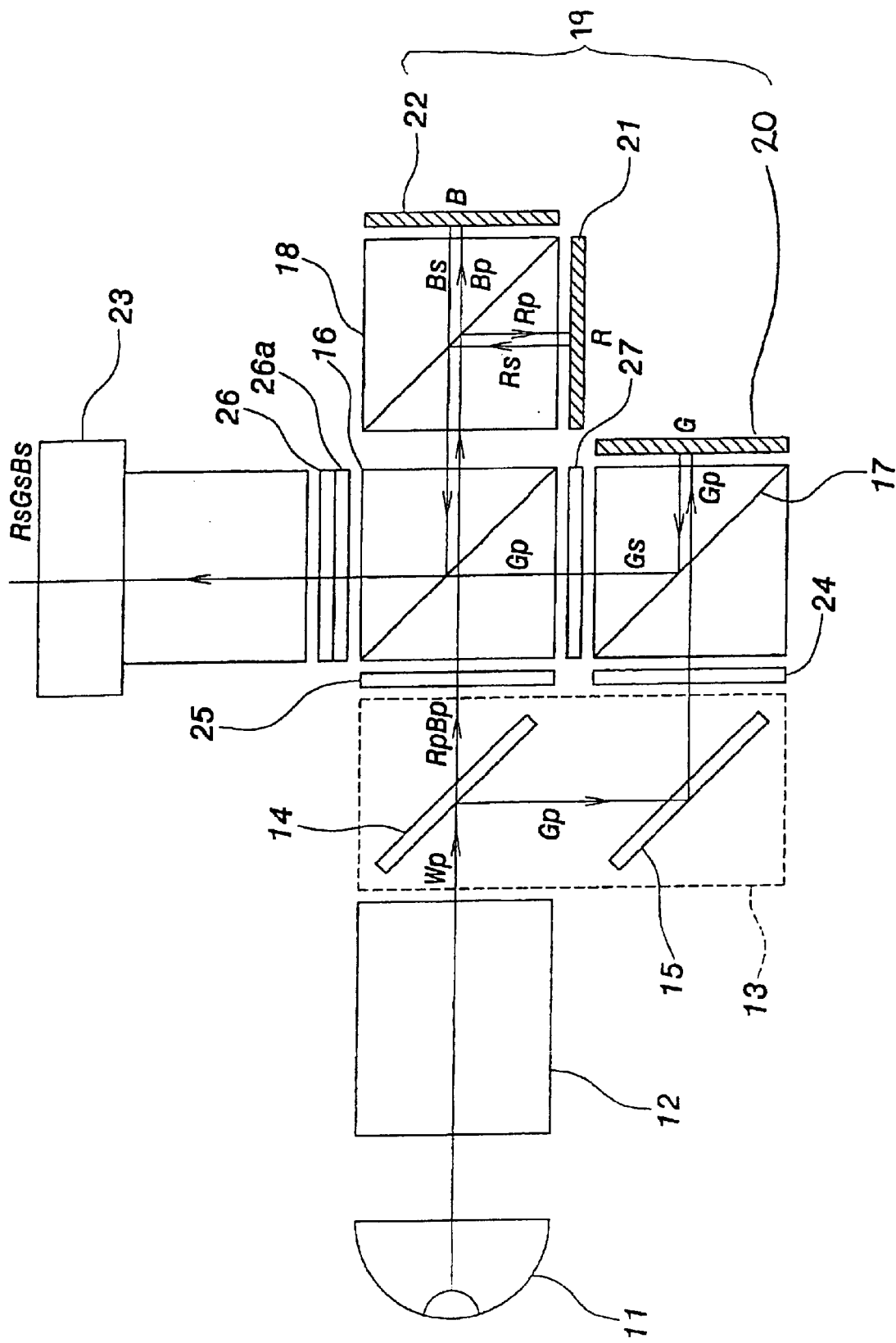
FIG. 1 illustrates the architecture of a LCD projection system according to the first embodiment of the present invention.

Referring to FIG. 1, a LCD projection system is shown comprising a light source 11 adapted to emit white light, a polarized component 12 adapted to polarize white light from the light source 11, a beam splitter unit 13 adapted to split light beam passing through the polarized component 12, a first polarization element 16 and a second polarization element 17 adapted to provide polarized light, a dichroic element 18 adapted to filter a particular color of light, a modulator 19 adapted to modulate light, and a projection lens 23 adapted to project output light beam.

The polarized component 12 is provided in the output light path of the light source 11 to convert white light from the light source 11 into a polarized (S-polarization or P-polarization) light source having the three prime colors (R.G.B).

The beam splitter unit 13 is comprised of a color separation lens 14 and a reflecting mirror 15, and provided in the output side of the polarized component 12. The color separation lens 14 splits polarized (S-polarization or P-polarization) light source from the polarized component 12 into two light beams, namely, the bi-color polarization beam that is directly outputted by the color separation lens 14 and the single primary color polarization beam that is reflected by the reflecting mirror 15.

The first polarization element 16 and the second polarization element 17 are provided in the output side of the beam splitter unit 13. The first polarization element 16 is disposed near one side of the color separation lens 14 to admit or reflect the two primary colors of the bi-color polarization beam subject to the S-polarization status or P-polarization status of the bi-color polarization beam. The second polarization element 17 is disposed near one side of the reflecting mirror 15 to admit or reflect the single primary color of the single primary color polarization beam reflected by the reflecting mirror 15 subject to the S-polarization status or P-polarization status of the single primary color polarization beam.

The dichroic element 18 is provided near one side of the first polarization element 16, and adapted to reflect one primary color of the two primary colors of the bi-color polarization beam and to admit the other primary color of the two primary colors of the bi-color polarization beam.

The modulator 19 is adapted to modulate inputted polarization light into a video signal contained polarization light and to output the video signal contained polarization light by reflection. The modulator 19 is comprised of a first LCOS (liquid crystal on silicon) 20, a second LCOS 21, and a third LCOS 22. The first LCOS 20 is disposed near one side of the second polarization element 17. The second LCOS 21 and the third LCOS 22 are respectively provided at two sides of the dichroic element 18.

The projection lens 23 is disposed near one side of the first polarization element 16, and adapted to project modulated polarization light from the modulator 19 onto the display screen.

Further, a polarizer 25 is provided in between the color separation lens 14 and the first polarization element 16. A polarizer 24 is provided in between the reflecting mirror 15 and the second polarization element 17. A polarizer 26 and a color-selective polarizer 26a are provided in between the first polarization element 16 and the projection lens 23. By means of the effect of the polarizers 24, 25, 26, and 26a, the invention eliminates uneven transmission or leakage of light, and improves the projection quality.

According to this embodiment, the color separation lens 14 reflects green light Gp from output light Wp of the polarized component 12, and admits red blue light RpBp from output light Wp of the polarized component 12. The reflecting mirror 15 reflects green light Gp onto the second polarization element 17. The second polarization element 17 is a PBS (polarizing beam splitter) that admits p-polarization and reflects s-polarization. Therefore, green light Gp passes through the second polarization element 17 to the first LCOS 20, which modularizes green light GP into video signal contained polarization light Gs onto the second polarization element 17. Before receiving by the first polarization element 16, video signal contained polarization light Gs passes from the second polarization element 17 through a half-wave retarder 27 that changes the polarization direction of input light. When passing through the half-wave retarder 27, video signal contained polarization light Gs is changed to green light Gp and then inputted into the first polarization element 16.

Further, red blue light RpBp passes from the color separation lens 14 to the first polarization element 16. The first polarization element 16 is a polarizing beam splitter that admits p-polarization and reflects s-polarization. Therefore, red blue light RpBp passes to the dichroic element 18. The dichroic element 18 is a dichroic prism that reflects red light and admits blue light, i.e., Rp of RpBp is reflected onto the second LCOS 21, and Bp of RpBp passes to the third LCOS 22. The second LCOS 21 modulates Rp into video signal contained Rs and reflects video signal contained Rs onto the dichroic element 18. The third LCOS 22 modulates Bp into video signal contained Bs and reflects video signal contained Bs onto the dichroic element 18. The dichroic element 18 outputs RsBs to the first polarization element 16, enabling the first polarization element 16 to reflect RsBs onto the projection lens 23 and to let Gp be converted into Gs by the color-selective polarizer 26a before passing from the half-wave retarder 27 to the projection lens 23. Therefore, the polarizer 26 purifies RsGsBs for output through the projection lens 23 to the display screen.

Figure 2:
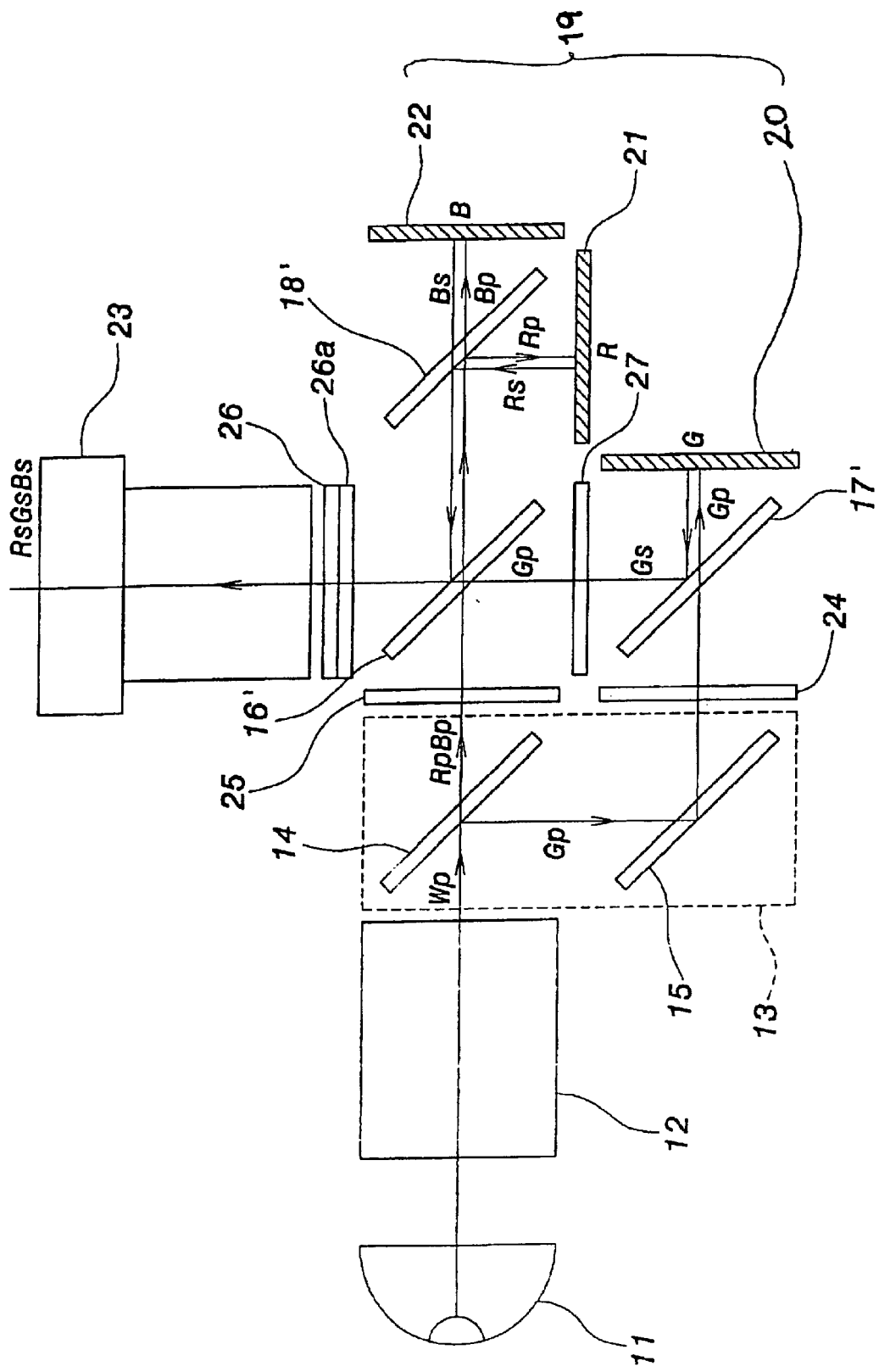
FIG. 2 illustrates the architecture of a LCD projection system according to the second embodiment of the present invention.

FIG. 2 shows a LCD projection system constructed according to the second embodiment of the present invention. This embodiment is more compact than the aforesaid first embodiment. According to this embodiment, the first polarization element 16 and the second polarization element 17 are polarizing color-selective lenses; and the dichroic element 18 is a dichroic lens.

A prototype of LCD projection system has been constructed with the features of FIGS. 1 and 2. The LCD projection system functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An LCD projection system comprising:
   a light source;
   a polarized component for polarizing a non-polarized white light emitted from the light source to a polarized light of three primary colors;
   a beam splitter having a color separation lens for separating the polarized light of three primary colors into a light of two primary colors and a light of one primary color, and a reflecting mirror for reflecting the light of one primary color;
   a first polarization element for polarizing the light of two primary colors outputted from the color separation lens to a polarized light of two primary colors;
   a second polarization element for polarizing the light of one primary color outputted from the reflecting mirror to a first color light;
   a dichroic element for separating the polarized light of two primary colors into a second color light and a third color light;
   a modulator having a first LCD panel for reflecting the first color light to a first color modulating light, a second LCD panel for reflecting the second color light to a second color modulating light and a third LCD panel for reflecting the third color light to a third color modulating light;
   a retarder arranged between the first polarization element and the second polarization element; and
   a projection lens disposed adjacent to one side of the first polarization element for synthesizing the first color modulating light, the second color modulating light and the third color modulating light into a color image to be displayed on a screen.

2. The LCD projection system as claimed in claim 1, further comprising a polarizer disposed between said first polarization element and said color separation lens.

3. The LCD projection system as claimed in claim 1, further comprising a polarizer disposed between said reflecting mirror and said second polarization element.

4. The LCD projection system as claimed in claim 1, wherein said first polarization element is a polarizing beam splitter.

5. The LCD projection system as claimed in claim 1, wherein said first polarization element is a polarizing color-selective lens.

6. The LCD projection system as claimed in claim 1, wherein said second polarization element is a polarizing beam splitter.

7. The LCD projection system as claimed in claim 1, wherein said second polarization element is a polarizing color-selective lens.

8. The LCD projection system as claimed in claim 1, wherein said dichroic element is a dichroic prism.

9. The LCD projection system as claimed in claim 1, wherein said dichroic element is a dichroic lens.

10. The LCD projection system as claimed in claim 1, wherein said retarder is a half-wave retarder.

11. The LCD projection system as claimed in claim 1, further comprising a color-selective polarizer provided between said first polarization element and said projection lens.

* * * * *